United States Patent [19]

Hug et al.

[11] 4,196,757

[45] Apr. 8, 1980

[54] OFFSET PERFORATED LEAD-ACID BATTERY GRID METHOD

[75] Inventors: Leonard F. Hug, Wheatridge; Toshio Uba, Denver, both of Colo.; Charles Frazier; John F. Varga, both of Harbert, Mich.

[73] Assignee: The Gates Rubber Company, Denver, Colo.

[21] Appl. No.: 4,416

[22] Filed: Jan. 18, 1979

Related U.S. Application Data

[62] Division of Ser. No. 880,419, Feb. 23, 1978, Pat. No. 4,151,331.

[51] Int. Cl.² .......................... B65B 3/04; H01M 7/00
[52] U.S. Cl. ....................................... 141/1.1; 429/94
[58] Field of Search ................ 429/94, 233, 237, 239, 429/241-245, 228; 29/623.5; 141/1.1, 32, 1; 118/400

[56] References Cited

U.S. PATENT DOCUMENTS

| | | | |
|---|---|---|---|
| 397,796 | 2/1889 | Gibson | 429/239 |
| 649,998 | 5/1900 | Sperry | 429/241 |
| 704,739 | 7/1902 | Ehtz | 429/239 |
| 1,600,083 | 9/1926 | Webster | 429/241 |

Primary Examiner—Houston S. Bell, Jr.
Attorney, Agent, or Firm—Curtis H. Castleman, Jr.; Raymond Fink; H. W. Oberg, Jr.

[57] ABSTRACT

A method for producing a grid for a lead-acid battery is disclosed having a network of integrally interconnected strands of lead in which a portion of the strands are offset and project from one face of the grid while a second portion of the strands project and are offset to the other opposed face of the grid, to form upstanding projections and alternating depressions. The grids are useful as current collector substrates in Faure plates.

3 Claims, 10 Drawing Figures

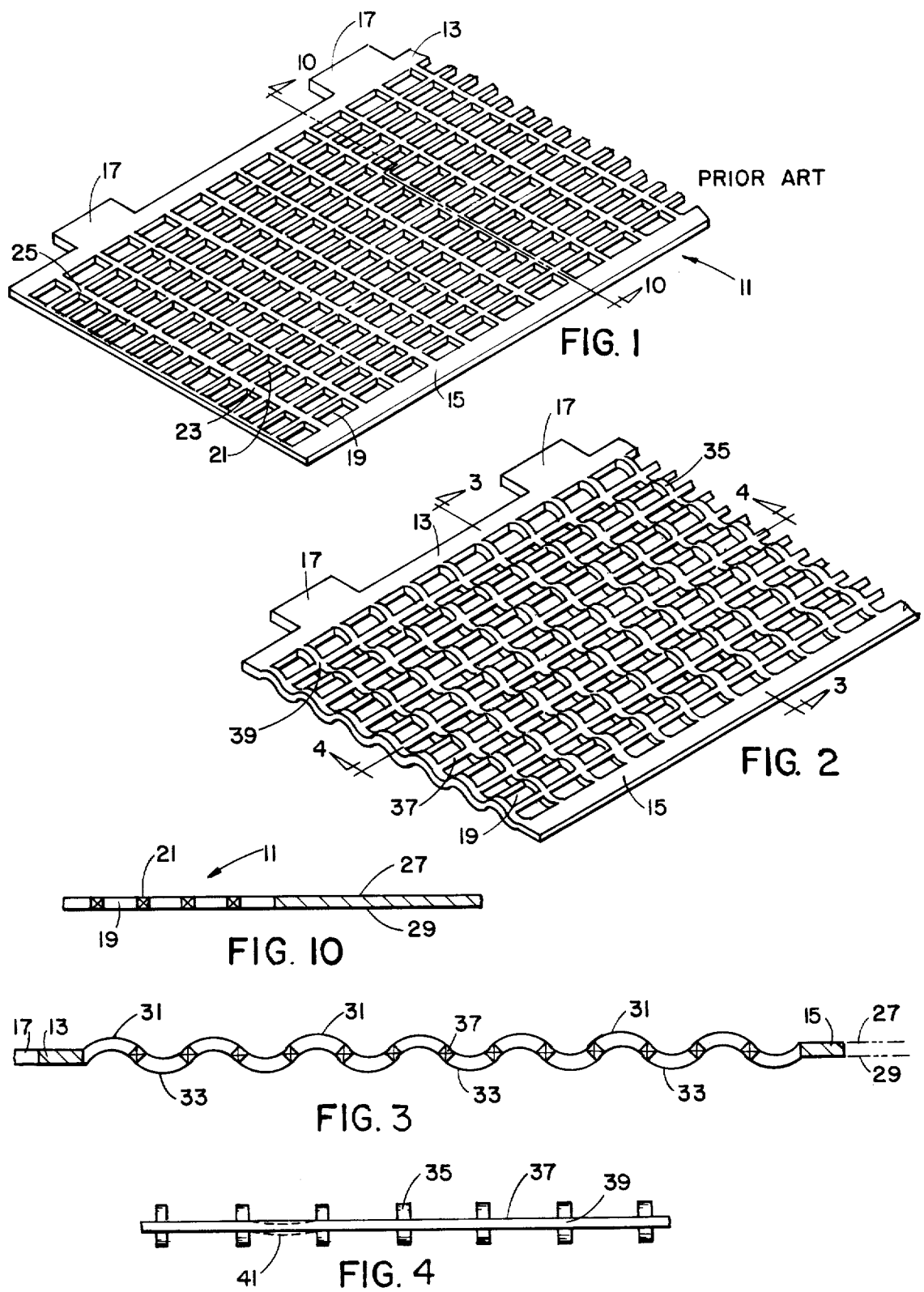

OFFSET PERFORATED LEAD-ACID BATTERY GRID METHOD

This is a division of application Ser. No. 880,419, filed on Feb. 23, 1978 now U.S. Pat. No. 4,151,331.

BACKGROUND OF THE INVENTION

This invention relates to a method for producing battery plates, particularly to generally planar flat sheet perforated lead grid substrate for pasted lead-acid battery plates.

It is known to form lead-acid accumulator grids by forming lead into sheets and then slitting and stretching the grid to form an expanded mesh. The expansion process involves considerable cold working of the lead which leads to corrosion of the grid. However, the expanded grid provides a good captivating matrix for the paste to reduce shedding. Also, because of the ability of the expanded grid to undergo a reduction in thickness, the continuous pasting of the grids is facilitated. Perforated lead grid, on the other hand, in which a flat lead sheet of substantially non-distortable thickness is perforated, stamped, rolled or slit to form apertures therein defining a mesh or grid structure, experiences reduced corrosion rates, as compared with expanded grid since less cold working of the lead takes place in the forming process. However, flat perforated grid is more difficult to paste, particularly with respect to driving the grid through the paster, and there is a lessened capability of the grid to fully captivate and retain the paste within the grid structure.

It is a primary object of the subject invention to produce a lead grid which combines the advantages of each of the expanded mesh and perforated types of lead grids.

SUMMARY OF THE INVENTION

Briefly described, the method of producing an elongated generally planar lead grid strip of perforated form, and for pasting such grid in accordance with the invention, includes the steps of sheeting lead into continuous planar strip form of a given width; perforating the lead sheet to form a generally planar sheet matrix of integrally interconnected strands of lead with perforation openings extending completely through the grid therebetween; offsetting strands of the grid in a uniform manner so that throughout the plate a portion of the strands are offset and project from one of the opposed principal faces of the plane of the grid, and another portion of the strands uniformly throughout the plate are offset to the opposite principal face of the plane of the grid, to form an undulating pattern of offset strands; the offsetting operation being accomplished so that the width of the grid is substantially unchanged after offsetting of the strands; and pasting the offset perforated grid to impregnate the perforations with paste and to form layers on each of the principal faces of the plate to thereby embed strands of the grid in paste.

The resultant grid provides excellent captivation or retention of the paste, possesses a strand distribution for well distributed current collection in use, and has not been cold worked nearly as much as expanded mesh for reduced corrosion upon cycling the resultant electrode plate. The grid is especially useful in elongated strip form having a flexibility to permit spiral winding in the production of spiral wound sealed lead-acid cells.

BRIEF DESCRIPTION OF THE DRAWINGS

The invention will be more particularly described with reference to the accompanying drawings, in which like numerals designate like parts, and in which:

FIG. 1 depicts in perspective a portion of a prior art flat surfaced perforated lead grid;

FIG. 2 shows an offset perforated grid according to the invention, in which a corrugated surface is formed;

FIG. 3 is a sectional view along line 3—3 of FIG. 2;

FIG. 4 is a sectional view along line 4—4 of FIG. 2;

FIG. 10 is a sectional view along line 10—10 of FIG. 1.

PREFERRED EMBODIMENTS OF THE INVENTION

Figure 5:
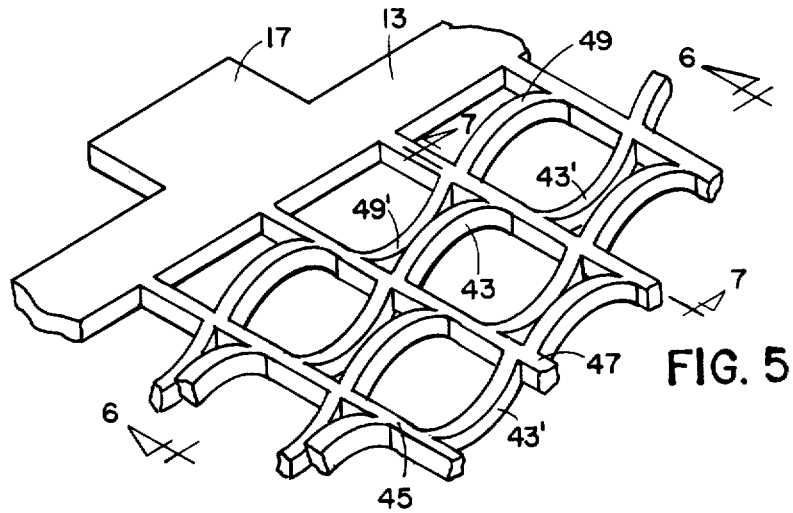
FIG. 5 is an enlarged partial perspective view of an alternative embodiment of the invention.
Figure 6:
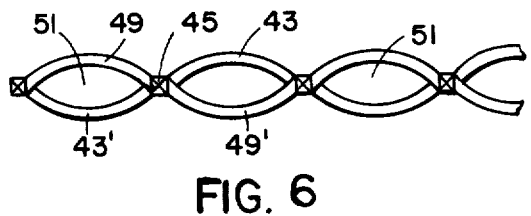
FIG. 6 is a sectional view along line 6—6 of FIG. 5.

Referring first to FIG. 1 of the drawings illustrating the prior art perforated grid, a segment of a continuous grid is shown at 11, generally comprising header margins 13 and 15, extending longitudinally with respect to the length of the grid. The lower margin 15 is optional. The grid carries at its upper margin 13 a plurality of current collector tabs 17. The grid, as also shown in FIG. 10 is formed of a generally planar flat sheet of lead substantially non-distortable in thickness, and having perforations 19 therein which may be formed in any known manner, such as stamping or die punching, for instance. The individual apertures 19 are defined by integrally interconnected longitudinal strands 21 and horizontal or transverse strands 23. The integral interconnection is made at nodes 25. The apertures or windows 19 are preferably generally rectangular. The strands lie in the plane of the grid and determine the respective opposed principal faces 27, 29 of the grid.

Referring now to the grid of the invention illustrated in the embodiment of FIGS. 2–4, a portion of the grid strands 31 are offset from the plane of the grid and project from one of the opposed principal faces 27, as defined by the original strand thickness and principal faces prior to deformation of the grid. Closely adjacent to the set of offset strands 31, is another set of strands 33 which are offset in the opposite direction, projecting away from principal face 29 of the grid. The grid is thereby formed having alternating projecting ridges and depressed grooves, and in FIG. 3 the grid in transverse section is of corrugated configuration. Alternatively, the corrugations could run longitudinally, or in any other desired direction, relative to the grid length.

Each of the transverse strands 35 and longitudinal strands 37, which together define a substantially rectangular perforation or aperture 19, is sufficiently malleable and soft to permit the desired deformation for converting the flat perforated grid of FIGS. 1 and 10 into the offset grid of the invention. Most preferably, the lead used in the grid will be substantially pure lead, minimally 99.9 percent pure lead, more preferably at least 99.99 percent lead. However, impurities (e.g., calcium or tin) aggregating greater than 0.1 percent which do not have the effect of substantially rigidifying the grid so that it is not sufficiently malleable to be wrought, or which does not have the effect of substantially reducing the hydrogen overvoltage of the resultant plate may be utilized. In general, the grid is sufficiently soft or deformable if the lead or lead alloy under the conditions of use has a Brinell hardness (10 mm/31.kg - 120 sec.) of preferably less than about 10 kg/mm², more preferably less than about 8 kg/mm². For instance, various lead-calcium alloys, e.g., containing 0.07 weight percent or less calcium, and lead-tin alloys containing preferably less than about 10 weight percent tin are generally sufficiently deformable.

As will be appreciated, the offset grid may be formed through various types of distortion. As shown alternatively in phantom in FIG. 4, the longitudinal strands 37 may also be deformed or stretched at 41, in addition to the deformed transverse strands 35. The deforming operation will usually cause a slight stretching of the strands (the overall dimensions of the grid—width and length—will remain substantially constant), however, this stretching operation is provided in such a manner that the cold working of the lead is minimized, and this can be done by deforming the strands in a substantially curvilinear configuration, as shown. The stretching of the strands in a curvilinear fashion will actually increase the surface area of the grid strands and thereby increase somewhat the current collection efficiency of the grid.

The deforming or stretching operation may also have the effect of displacing nodes 39 out of the plane of the grid, however, in the embodiment of FIGS. 2–4 nodes 39 preferably will remain substantially in the plane of the original perforated grid.

Figure 7:
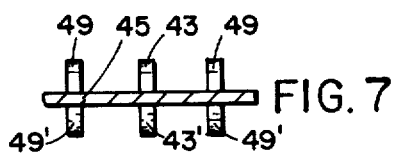
FIG. 7 is a sectional view along line 7—7 of FIG. 5.

In the embodiment of FIG. 5, offsetting has been obtained in a different manner. In this embodiment, the longitudinal strands 43 are substantially sinuous, as were the transverse strands 35 in FIG. 2. In this case, a portion of the strands 43 extend away from one principal face of the grid, while alternate strands 43' extend from the other principal face. The next adjacent row of longitudinal strands also carries sinuous strands of which a portion 49 extend above or project from one principal face of the grid while strands 49' extend from the other principal face of the grid. With the offsetting being staggered from one longitudinal strand row to the next, cells or skeleton enclosures 51 are formed for paste reception. The various strands are interconnected at nodes 45 which preferably lie in the plane of the grid, as seen also in FIG. 7.

Figure 8:
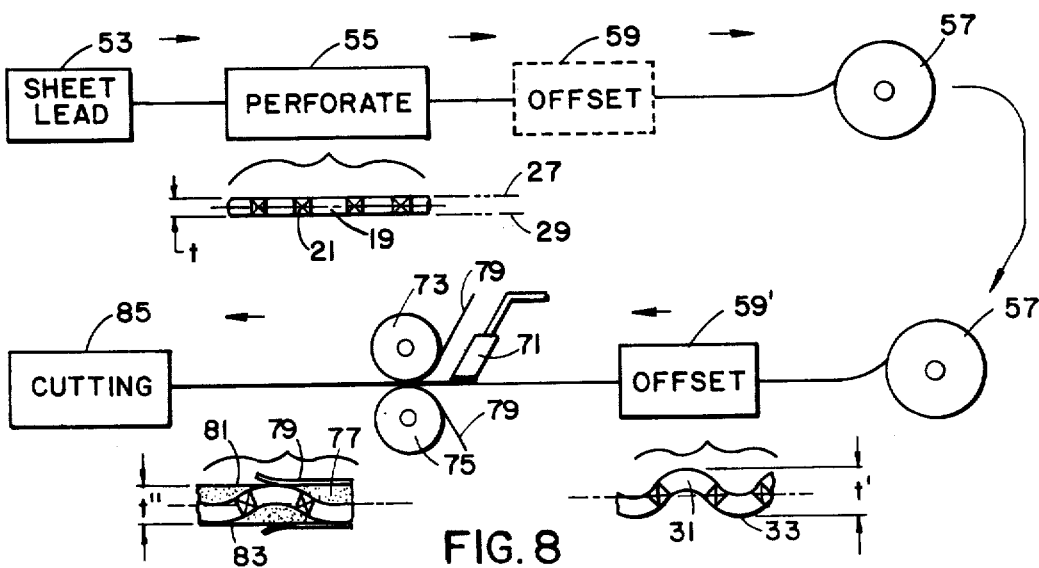
FIG. 8 is schematic flow diagram of a process for producing pasted offset grid in continuous manner according to the invention, including depicting the approximate configuration of the grid in transverse section at three different locations during such processing.

One method of forming the grid of the invention and pasting that grid is shown schematically in FIG. 8. Sheet lead 53, which may be cast or rolled or otherwise formed into continuous strip form of desired width, is supplied to perforator 55, which forms the perforations 19 in the grid, shown in transverse section in FIG. 8. The grid after perforation is in a generally planar sheet form with integrally interconnected strands of lead all lying in the plane of the grid and having thickness "t" determined by the opposed principal faces 27, 29. At this stage, the perforated grid may be rolled up onto take-up roll 57 for storage and later use at the pasting station, or may be directly subjected to offsetting according to the invention at 59 and then directly pasted, or wound up on take-up roll 57. More preferably, however, to maintain the uniformity of the strand offset configuration for pasting, the un-offset perforated grid is let off roll 57 and offset at 59'.

According to a further alternative, the offset may be induced into the lead sheet simultaneously with perforation of the sheet.

Figure 9:
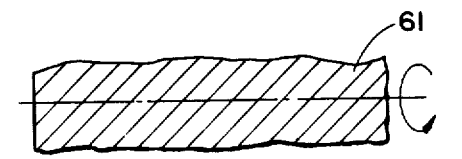
FIG. 9 is a partial sectional view of one form of apparatus for forming the grid of FIG. 2.

Those skilled in the art will appreciate the various types of dies, roller arrangements or other forming operations which can be employed to produce the desired offsets or corrugations in the grid. For instance, to produce the transversely corrugated grid configuration of FIGS. 2–4, the apparatus of FIG. 9 can be employed at station 59'. As shown in FIG. 9, a pair of oppositely rotatable roller dies 61, 63 having circumferential corrugated die surfaces 65, 67 may be employed. The die surfaces 65, 67 are so configured and nested that the corrugated, sinusoid configuration of FIG. 3 is produced when the perforated sheet flat grid is advanced through nip 69 between the die surfaces. As previously discussed, the principal width and length dimensions of the grid will not be varied by the offsetting operation. After offsetting, the original thickness t of the grid is increased to an apparent thickness t'.

After offsetting, the corrugated grid (shown in FIG. 2) is longitudinally advanced into the pasting station and past a paste application nozzle 71, from which paste is supplied to the grid in predetermined quantity, and then through a pair of drive rollers 73, 75, which may be separated from the paste 77 by anti-sticking pasting paper 79, sandwiched between each of the rollers and pasted plate. The nip setting of roller 73 and 75 may be chosen so that a slight calendering of the paste onto and into the grid is effected, so that the apparent thickness of the grid is reduced from t' to t''. In a particular example, the original thickness t of the grid was about 0.030 inches, the apparent thickness t' of the offset grid from about 0.055 to about 0.075 inches, and the final calendered apparent thickness t'' was about 0.045 inches. In general, thickness t' is at least about 50 percent, more preferably at least about 100 percent greater than the original thickness t of the grid. Similarly, the final thickness t'' of the grid is preferably at least about 25 and more preferably at least about 70 percent greater than the original thickness t of the grid.

In the final electrode plate, as shown in FIG. 8 in cross section, the grid is fully embedded in the paste, which impregnates the perforation apertures as well as forming layers 81 and 83 on each of the principal faces of the plate. In the final operation, the pasted plate may be cut or profiled at 85 to form a finished plate.

The invention is capable of a variety of modifications and variations which will become apparent to those skilled in the art upon a reading of this specification and the appended claims.

What is claimed is:

1. A method for continuous production of an elongated generally planar lead grip strip formed of a matrix of interconnected lead strands with perforation openings therebetween, having an apparent thickness greater than the thickness of the individual strands, and for pasting the grid, comprising:

sheeting lead into continuous planar strip form of a given width;

perforating the lead sheet to form a generally planar sheet matrix of integrally interconnected strands of lead with perforation openings extending completely through the grid therebetween;

offsetting strands of the grid in a uniform manner so that throughout the plate a portion of the strands are offset and project from one of the opposed principal faces of the plane of the grid, and another portion of the strands uniformly throughout the plate are offset to the opposite principal face of the plane of the grid, to form an undulating pattern of offset strands;

said offsetting operation being accomplished so that said width of the grid is substantially unchanged after offsetting the strands; and pasting the offset perforated grid to impregnate the perforations with paste and to form layers on each of the principal faces of the plate to thereby embed strands of the grid in paste.

2. The method of claim 1 wherein the offsetting operation increases the apparent thickness of the grid at least about 50% from the original sheeted thickness, and thereafter the paste is applied by a calendering operation which reduced the thickness of the grid to its final, pasted form which is in the range from about 25 to about 70% greater than the original sheeted thickness of the grid.

3. The method of claim 1 wherein offsetting the strands of the grid is accomplished by passing the grid through a pair of oppositely rotatable dies having mating undulating die surfaces.

* * * * *